Patented Mar. 17, 1931

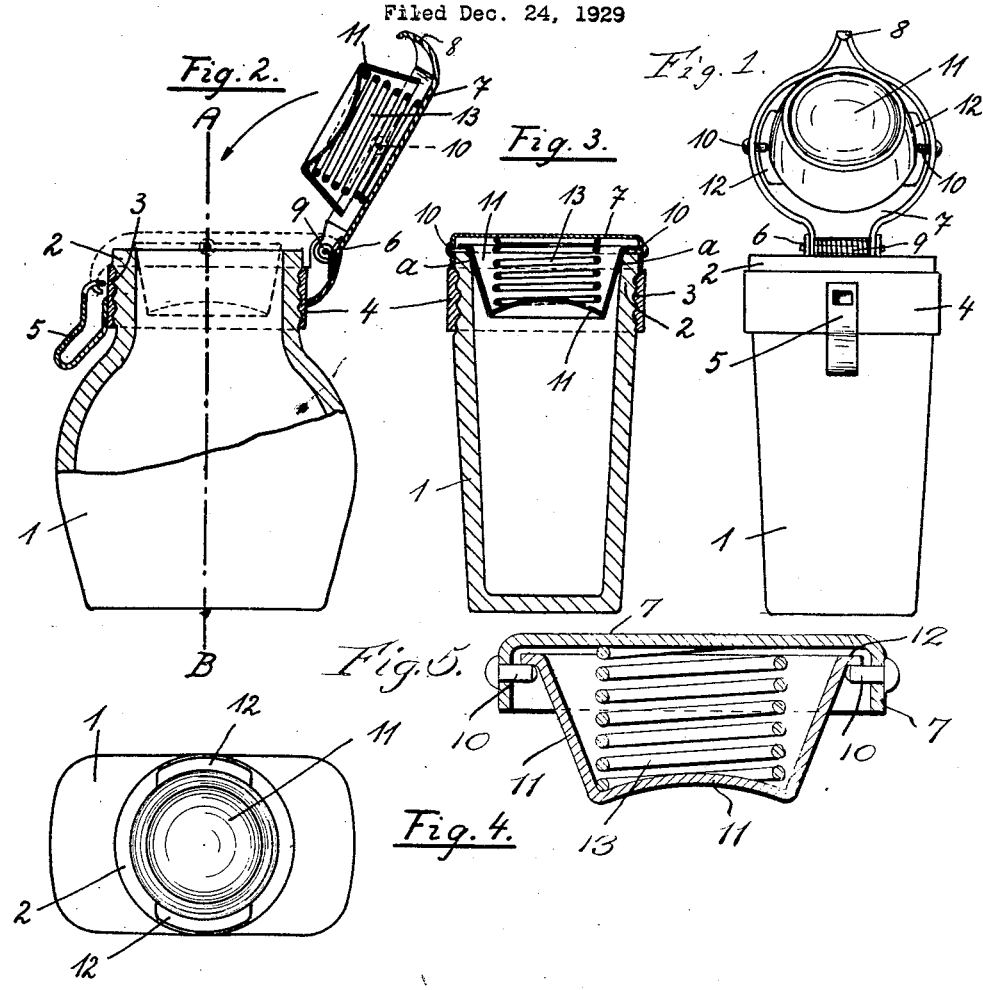

1,796,999

UNITED STATES PATENT OFFICE

WALTER KUNDT, OF ST. GALLEN-ROTMONTEN, SWITZERLAND

SPUTUM RECEPTACLE

Application filed December 24, 1929, Serial No. 416,224, and in Germany December 27, 1928.

The invention relates to sputum receptacles for use by persons suffering from pulmonary diseases, the same being of the kind in which the container body is bottle or flask shaped and is discarded after use, a fresh container being attached to a lid from which the old container has been removed. According to my invention the container is attached to the lid by fixing only the neck of the container into a ring or collar forming part of the lid, there being no casing or holder round the body of the container except the collar or ring embracing its neck.

Two receptacles constructed in accordance with the invention are shown in the accompanying drawing, in Figs. 1 to 5 respectively.

Fig. 1 is an elevation, showing the lid open, and

Fig. 2 is a view from the right of Fig. 1, partly in section;

Fig. 3 being a section on the line A—B of Fig. 2, but with the lid closed, and

Fig. 4 a plan view of the bottle without the hinged lid.

Fig. 5 is a vertical section of the lid and stopper on a larger scale.

Referring to the drawing, 1 is the flask or bottle shaped body of the receptacle, consisting of easily destructible, preferably combustible material, say pressed cardboard or paper. The neck 2 thereof has an external screw thread 3 for engaging an internally screw threaded metal ring 4. A resilient catch 5 is fixed externally to part of the circumference of this ring 4, and at the opposite part of the circumference there is a hinge 6 for a lid 7. The lid has a hook 8 adapted to engage an opening in the catch 5. A spring 9 coiled on the hinge pin tends to hold the lid open. Two screws 10 are screwed into the lid, at opposite parts of the circumference, for supporting a cupped, internal lid member 11 adapted to enter the mouth of the bottle. This inner lid member 11 has at its rim two flanges 12, under which the screws 10 engage, and in the cup there is a coiled spring 13 compressed between the floor of the cup and the lid 7. At the rim of the bottle neck the cupped member 11 fits tightly into the neck, as shown at $a$, $a$ in Fig. 3.

For removing and discarding the receptacle 1 the same is screwed out of the ring 4, with the lid closed. By friction the receptacle rotates the member 11, and the lugs 12 are moved clear of the screws 10, allowing the spring 13 to push the member 11 farther into the neck, so that by the continued unscrewing of the receptacle the member 11 is removed with it from the lid 7. When a fresh inner lid 11 and receptacle 1 are to be attached to the ring 4 and lid 7, the lugs 12 of the member 11 are first engaged behind the screws 10, the spring 13 being compressed to allow of doing this.

What I claim as my invention and desire to secure by Letters Patent of the United States is:

1. A sputum receptacle comprising in combination a rigid, bottle shaped container having a neck and consisting of combustible material, and a closure for said container having a collar embracing and engaging said neck but not otherwise surrounding said container.

2. A sputum receptacle comprising in combination a rigid, bottle shaped combustible container having a neck, a lid for said container having a collar embracing and engaging said neck, a stopper under said lid, fitting into the mouth of said container, means engaging said stopper with said lid, disengageable while said lid is closed, and a spring between said lid and stopper.

3. A sputum receptacle comprising in combination a rigid, bottle shaped, combustible container having a neck, a lid for said container having a collar embracing and engaging said neck, a stopper under said lid, fitting into the mouth of said container, means engaging said stopper with said lid, disengageable by rotation of said stopper while said lid is closed, and a spring between said lid and stopper.

4. A sputum receptacle comprising in combination a bottle shaped container having a neck, a removable collar embracing and engaging said neck, a flanged lid connected to said collar, having inwardly directed pins projecting from its flange, and a stopper fitting tightly into the mouth of said container, having lugs adapted by rotation of said stopper to engage said pins for connecting said stopper to said lid.

5. A sputum receptacle comprising in combination a bottle shaped container having a neck, a removable collar embracing and engaging said neck, a flanged lid connected to said collar, having inwardly directed pins projecting from its flange, a stopper fitting tightly into the mouth of said container, having lugs adapted by rotation of said stopper to engage said pins for connecting said stopper to said lid and a spring between said lid and said stopper.

6. A sputum receptacle comprising in combination a bottle shaped container having a neck, a removable collar embracing and engaging said neck, a lid connected to said collar, a stopper for said container under said lid, and means disengageable while said lid is closed, engaging said stopper with said lid.

WALTER KUNDT.